(12) United States Patent
Saint-Jalmes et al.

(10) Patent No.: US 9,010,686 B2
(45) Date of Patent: Apr. 21, 2015

(54) MODULE FOR AN AIRCRAFT

(75) Inventors: Bruno Saint-Jalmes, Toulouse (FR); André Rezag, Toulouse (FR); Jason Zaneboni, Toulouse (FR); Markus Schumacher, Buxtehude (DE); Andrew Muin, Harsefeld (DE); Cord Haack, Beckdorf (DE); Michael Carr, Colomier (FR)

(73) Assignee: Airbus S.A.S. (FR)

( * ) Notice: Subject to any disclaimer, the term of this patent is extended or adjusted under 35 U.S.C. 154(b) by 1722 days.

(21) Appl. No.: 12/087,328

(22) PCT Filed: Dec. 27, 2006

(86) PCT No.: PCT/EP2006/012545
§ 371 (c)(1), (2), (4) Date: May 28, 2009

(87) PCT Pub. No.: WO2007/073938
PCT Pub. Date: Jul. 5, 2007

(65) Prior Publication Data
US 2009/0283636 A1    Nov. 19, 2009

Related U.S. Application Data

(60) Provisional application No. 60/754,745, filed on Dec. 29, 2005.

(30) Foreign Application Priority Data

Dec. 29, 2005   (EP) ..................................... 05028664

(51) Int. Cl.
*B64D 11/00* (2006.01)
*B64D 11/06* (2006.01)

(52) U.S. Cl.
CPC .............. *B64D 11/003* (2013.01); *B64D 11/00* (2013.01); *B64D 11/06* (2013.01);
(Continued)

(58) Field of Classification Search
USPC ......... 244/117 R, 118.1, 118.2, 118.5, 118.6; 105/345
See application file for complete search history.

(56) References Cited

U.S. PATENT DOCUMENTS

| 628,605 A | 7/1899 | Ottenheimer |
| 747,489 A * | 12/1903 | Rounds ........................ 105/345 |

(Continued)

FOREIGN PATENT DOCUMENTS

| DE | 9116031 U | 3/1992 |
| DE | 4301681 | 10/1994 |

(Continued)

OTHER PUBLICATIONS

Japanese Office Action summary for counterpart Application No. 2008-547897, dated Nov. 8, 2011, with English translation.
(Continued)

*Primary Examiner* — Tien Dinh
*Assistant Examiner* — Steven Hawk
(74) *Attorney, Agent, or Firm* — Lerner, David, Littenberg, Krumholz & Mentlik, LLP

(57) ABSTRACT

A module for an aircraft having a fuselage structure and a floor element defining a floor plane. The module includes a frame device adapted for mounting a functional element and the frame device is adapted for attachment to the floor element of the aircraft at a first location in the floor plane. The frame device is adapted for attachment to the fuselage structure of the aircraft at a second location, wherein the second location is not in the floor plane.

23 Claims, 15 Drawing Sheets

(52) U.S. Cl.
CPC ... *B64D 11/0696* (2013.01); *B64D 2011/0046* (2013.01); *B64D 2011/0617* (2013.01); *B64D 2011/0634* (2013.01); *B64D 2011/0644* (2013.01); *B64D 2011/0658* (2013.01); *B64D 2011/0675* (2013.01); *Y02T 50/46* (2013.01)

(56) References Cited

U.S. PATENT DOCUMENTS

| | | | |
|---|---|---|---|
| 1,378,210 A | 5/1921 | Berry | |
| 1,829,486 A | 10/1931 | Kimbrig et al. | |
| 2,067,585 A * | 1/1937 | Trimbach | 89/37.16 |
| 2,985,413 A * | 5/1961 | Widman | 244/140 |
| 3,142,461 A * | 7/1964 | Tomlinson | 244/137.1 |
| 3,173,627 A * | 3/1965 | Cohen | 244/171.9 |
| 3,610,560 A | 10/1971 | Dillabough | |
| 3,630,566 A * | 12/1971 | Barecki | 296/63 |
| 3,632,029 A | 1/1972 | Sonner | |
| 3,817,434 A | 6/1974 | Dickman | |
| 4,071,210 A * | 1/1978 | Mutke | 244/118.6 |
| 4,175,723 A * | 11/1979 | Shea, Jr. | 244/171.9 |
| 4,216,927 A | 8/1980 | Byrd | |
| 4,624,502 A | 11/1986 | Boole | |
| 5,015,033 A | 5/1991 | Winters | |
| 5,083,727 A | 1/1992 | Pompei et al. | |
| 5,104,065 A * | 4/1992 | Daharsh et al. | 244/118.6 |
| 5,180,120 A * | 1/1993 | Simpson et al. | 244/118.6 |
| 5,379,701 A * | 1/1995 | Sumi et al. | 104/89 |
| 5,556,332 A | 9/1996 | Schumacher | |
| 5,573,288 A | 11/1996 | Raffensperger | |
| 5,651,733 A * | 7/1997 | Schumacher | 454/76 |
| 5,716,026 A * | 2/1998 | Pascasio et al. | 244/118.6 |
| 5,772,370 A | 6/1998 | Moore | |
| 5,775,642 A * | 7/1998 | Beroth | 244/118.6 |
| 5,795,018 A | 8/1998 | Schumacher et al. | |
| 5,816,650 A | 10/1998 | Lucas, Jr. | |
| 5,820,076 A | 10/1998 | Schumacher et al. | |
| 5,820,210 A | 10/1998 | Shipman et al. | |
| 5,829,836 A * | 11/1998 | Schumacher et al. | 297/257 |
| 5,927,800 A | 7/1999 | Stallworth | |
| 5,984,415 A * | 11/1999 | Schumacher et al. | 297/411.2 |
| 6,053,570 A | 4/2000 | Stern et al. | |
| 6,056,239 A * | 5/2000 | Cantu et al. | 244/118.6 |
| 6,082,816 A | 7/2000 | Gottlieb et al. | |
| 6,318,671 B1 * | 11/2001 | Schumacher | 244/118.5 |
| 6,340,136 B1 | 1/2002 | Luria | |
| 6,439,633 B2 | 8/2002 | Nemoto | |
| 6,481,798 B2 | 11/2002 | Romca et al. | |
| 6,494,404 B1 * | 12/2002 | Meyer | 244/118.2 |
| 6,578,795 B2 | 6/2003 | Romca et al. | |
| 6,601,913 B2 | 8/2003 | Romca et al. | |
| 6,615,421 B2 | 9/2003 | Itakura | |
| 6,719,347 B2 | 4/2004 | Gehring et al. | |
| 6,776,373 B1 * | 8/2004 | Talmage, Jr. | 244/140 |
| 6,776,457 B2 | 8/2004 | Muin et al. | |
| 6,883,753 B1 | 4/2005 | Scown | |
| 6,921,129 B2 | 7/2005 | Katz et al. | |
| 7,201,421 B2 | 4/2007 | Reynolds et al. | |
| 7,300,112 B2 * | 11/2007 | Johnson | 297/452.18 |
| 7,338,131 B2 | 3/2008 | Forgatsch et al. | |
| 7,516,919 B2 * | 4/2009 | Young et al. | 244/118.5 |
| 7,523,993 B1 * | 4/2009 | Daneault et al. | 297/464 |
| 7,770,523 B2 * | 8/2010 | Kovac | 104/86 |
| 7,857,259 B2 * | 12/2010 | Baatz et al. | 244/122 R |
| 7,871,039 B2 * | 1/2011 | Fullerton et al. | 244/118.5 |
| 7,922,119 B2 * | 4/2011 | Muin et al. | 244/118.5 |
| 8,087,613 B2 * | 1/2012 | Fullerton et al. | 244/118.5 |
| 2001/0025400 A1 | 10/2001 | Romca et al. | |
| 2001/0050499 A1 | 12/2001 | DeLoach et al. | |
| 2003/0222174 A1 | 12/2003 | Saint-Jalmes | |
| 2004/0016847 A1 | 1/2004 | Ritts | |
| 2004/0066065 A1 | 4/2004 | Forstner et al. | |
| 2004/0245897 A1 | 12/2004 | Stephan et al. | |
| 2005/0200186 A1 | 9/2005 | Schumacher et al. | |
| 2005/0236523 A1 * | 10/2005 | Schwartz et al. | 244/119 |
| 2005/0264085 A1 | 12/2005 | Schumacher et al. | |
| 2005/0269451 A1 | 12/2005 | Schumacher et al. | |
| 2006/0006704 A1 | 1/2006 | Skelly et al. | |
| 2006/0049310 A1 * | 3/2006 | Park et al. | 244/118.5 |
| 2006/0054742 A1 * | 3/2006 | Druckman et al. | 244/118.5 |
| 2006/0237585 A1 | 10/2006 | Lau et al. | 244/118.5 |
| 2007/0080258 A1 * | 4/2007 | Baatz et al. | 244/118.6 |
| 2007/0164155 A1 * | 7/2007 | Muin et al. | 244/118.5 |
| 2008/0078870 A1 * | 4/2008 | Kneller et al. | 244/118.5 |
| 2008/0210815 A1 * | 9/2008 | Young et al. | 244/118.5 |
| 2008/0283662 A1 * | 11/2008 | Park | 244/118.5 |
| 2009/0091171 A1 * | 4/2009 | Valverde Fernandez | 297/325 |
| 2009/0230244 A1 * | 9/2009 | Kofinger et al. | 244/118.5 |
| 2010/0282902 A1 * | 11/2010 | Rajasingham | 244/118.6 |
| 2012/0074258 A1 * | 3/2012 | Papke et al. | 244/118.5 |
| 2012/0145828 A1 * | 6/2012 | Grosse-Plankermann et al. | 244/118.5 |
| 2012/0248245 A1 * | 10/2012 | Schliwa | 244/118.5 |
| 2012/0248246 A1 * | 10/2012 | Savian | 244/118.6 |

FOREIGN PATENT DOCUMENTS

| | | |
|---|---|---|
| DE | 19502658 | 3/1996 |
| DE | 29606532 U | 6/1996 |
| DE | 19534025 | 11/1996 |
| DE | 19533981 | 12/1996 |
| DE | 19534024 | 3/1997 |
| DE | 10008258 | 9/2001 |
| DE | 10052591 | 9/2001 |
| DE | 10052593 | 9/2001 |
| DE | 10052594 | 9/2001 |
| DE | 10052595 | 9/2001 |
| DE | 20120481 U | 5/2003 |
| DE | 10224048 | 12/2003 |
| DE | 202004008069 U | 7/2004 |
| DE | 102004002169 | 9/2005 |
| DE | 102004012480 | 10/2005 |
| DE | 102004025125 | 12/2005 |
| DE | 102004025982 | 12/2005 |
| EP | 1279593 | 1/2003 |
| EP | 1637451 | 3/2006 |
| FR | 2755656 A1 | 5/1998 |
| JP | 9-20293 A | 1/1997 |
| JP | 09020293 A | 1/1997 |
| JP | 2007523002 A | 8/2007 |
| SU | 1362300 A1 | 2/2005 |
| WO | 2005/080196 A1 | 9/2005 |

OTHER PUBLICATIONS

International Search Report, PCT/US2006/012545.

* cited by examiner

MODULE FOR AN AIRCRAFT

REFERENCE TO RELATED APPLICATIONS

This application claims the benefit of the filing date of European Patent Application No. 05 028 664.0 filed Dec. 29, 2005 and of U.S. Provisional Patent Application No. 60/754, 745 filed Dec. 29, 2005, the disclosure of which applications is hereby incorporated herein by reference.

TECHNICAL FIELD

The present invention relates to a module, a system and a method for aircrafts, the use of a module in an aircraft and to an aircraft.

BACKGROUND OF THE INVENTION

Today's commercial aircraft cabins are designed to accommodate passengers and their luggage by providing several distinct and largely independent components. More precisely, the individual passenger cabin environment is made up of seats, for instance including underseat stowage, life vests, information placards, literature pouches, plus overhead stowage bins including passenger service units, for instance reading lights, air outlets, information signs, loudspeakers and supplemental oxygen. These items are mostly designed by different parties and integrated or assembled on the aircraft in fixed locations with the specified spatial arrangement. Aircraft provisions for the attachment of seats are typically provided via floor structure with limited incremental positioning. Overhead stowage bins are installed in a fixed location and provide accommodation for PSU Passenger Service Unit) components. The layout of a specific customer cabin is fixed to a certain configuration and involves a significant effort by the aircraft manufacturer to vary the installation and also on behalf of the customer to make adaptations in service. Further on, today's passengers carry personal belongings on board of the aircraft which have to be placed in stowage bins. The available space has to be shared with the others. This situation is derived from a classical baggage stowage compartment type, which is oriented longitudinally along the cabin, for instance in the x-direction respectively the longitudinal direction of the fuselage. The opening of the stowage bins is typically above the aisle orthogonal to the longitudinal direction of the fuselage, so that the passengers interfere themselves. This results in inefficient turnaround time and the poor access to the belongings during the flight.

In the past, many different seat and stowage bin configurations and further partial solutions were accomplished to improve the space situation in the cabin of an aircraft.

For instance, DE 43 01 681 C1 describes a satellite like a PSU which can be shifted in longitudinal direction without disrupting any of its functions. All PSU functions are fed to the PSU. DE 195 02 658 C1 describes essentially the same functional principles for satellites, but the unit is supported by a flexible arm that allows the PSU to give way to the opening of a pivoting bin. DE 195 33 981 C1 reveals an arrangement with PSU functions around the individual passenger seat and unfolds a privacy umbrella when the seat is reclined. The feeding of the PSU function allowing for layout changes. DE 195 34 025 discloses PSU functions around the passenger seat and is designed in a column. The column can be part of the transversal seat structure or is separate flats transversal elements on the floor either in front of the seat or behind it and companying the seat roll without functional disruption when it is moved for a change of layout.

SUMMARY OF THE INVENTION

It is an object of the invention to provide a stable installation for functional elements. The object may be solved by a module, by a system and by a method for an aircraft, by the use of the module in an aircraft and by an aircraft with the features according to the independent claims.

According to an exemplary embodiment of the invention a module for an aircraft is provided, wherein the aircraft having a fuselage structure and a floor element. The floor element is defining a floor plane. The Module comprises a frame device wherein the frame device is adapted for mounting a functional element. Further, the frame device is adapted for attachment to the floor element of the aircraft at a first location in the floor plane and the frame device is adapted for attachment to the fuselage structure of the aircraft at a second location. Thereby, the second location is not in the floor plane.

According to a further exemplary embodiment of the invention, a system for providing a module for an aircraft is provided. The system comprises a plurality of modules according to the present invention and a control unit. The plurality of modules is adapted to be movable electrically, wherein the control unit is adapted to control the plurality of modules in such a way, that each of the plurality of modules is movable along a fuselage.

According to a further exemplary embodiment of the invention, a method for is provided. Thereby, a functional element is mounted to a frame device. The frame device is attached to a floor element of the aircraft at a first location in the floor plane and further on, the frame device is attached to the fuselage structure of the aircraft at a second location. Thereby, the floor element is defining a floor plane, wherein the second location is not in the floor plane.

In the following, the expression "functional element" shall define for instance all installations in the cabin of an aircraft, that are installed in the environment of the passenger, such as seats, stowage bins, monuments, galleys, lavatories, movable class dividers, PSU's (passenger service units), lighting, air condition, loudspeakers, televisions, computers and oxygen masks etc.

The wording fuselage structure shall define for instance the fuselage skin, the aircraft frames, the aircraft stringers or the cabin related parts. The wording floor element shall define for instance the different floor levels inside an aircraft. With the present invention it is possible to provide more stability for the connection of the functional elements. In order to meet current safety standards for functional elements it is necessary to design the connections of functional elements in such a manner, that the functional elements are able to withstand loads of 16 g in each direction. By using common connection methods, great effords have to be accomplished to comply with these requirements. As a result the connecting systems are very heavy and huge constructions. With the present invention, a lighter connection can be provided. By connecting the functional elements not exclusively in the floor plane but also in another plane, for instance to a fuselage structure, the forces that affect the functional elements can be reduced, because for instance the loads induced by acceleration torque can be minimized.

According to a further exemplary embodiment, the frame device surrounds the functional element. The frame device is connected to the functional element by at least two connection points, whereby the connection points are not located in the same plane. Thereby, the frame device surrounds the centre of gravity of the functional element, so that the an optimized load distribution of acceleration forces can be provided and torques reduced or avoided. Therewith the frame device provides more stability. If a connecting line between two connecting points of the frame device to the functional element runs through the centre of gravity of the functional element an optimized load distribution of the functional element can be provided.

According to a further exemplary embodiment of the invention, the frame device is adapted for a slideable attachment to the floor element of the aircraft and the fuselage structure, such that the frame device is relocatable from a first position in the aircraft by a sliding movement to a second position in the aircraft. The second position can be at a distance in the longitudinal direction of the aircraft from the first position.

With this exemplary embodiment a very flexible cabin layout can be provided. In airplanes many functional elements like oxygen masks, seats or air condition are often fixed to the floor elements or the fuselage structure. By changing the seat configuration, also the functional elements in the overhead area have to be changed accordingly to the new seat position. In common airplanes, the functional elements in the overhead area are fixed to the floor structure, so that it is very complicated to change their position. According to the present invention, the functional element is attached by an attachment element to a relocatable frame device. This frame device can be fixed to the primary aircraft structure or the secondary structure, such as the cabin related parts and the floor in such a way, that in case of changing the cabin layout or position of all functional elements, for instance a seat position, a further functional element for instance a stowage bin, will be repositioned automatically by changing the position of the frame device. Thus, a new cabin layout can be configured rapidly. By using the present invention, airliners could be able to adapt the capacity of their cabin layouts, such as for instance business or economy class layouts, to the amounts of the tickets sold for each class. Therefore, by changing the position of each module in a very short period of time, flexible capacities of i.e. business class or economy class can be configured by enlarging or reducing the distance between the modules respectively the seats. Very short turn-around times and an optimized utilization can be provided.

According to a further exemplary embodiment of the invention, the floor element of the aircraft and the fuselage structure comprise a rail element. The rail element is adapted for mounting the frame device slideable in such a manner, that the frame device is relocatable along the rail element. With this rail principle, an efficient construction is provided to remove the module easily in direction of the rail. Depending on the forces that affect the module a plurality of rails can be provided on a plurality of connection points around the frame device in order to reinforce the fixation of the module. In case of changing the cabin configuration, the module can easily slide so that the reconfiguration time can be shortened.

According to a further embodiment of the invention, the module further comprises a damper element. The damper element is thereby attached between the module and at least to one of the fuselage structure and the floor element. The damper element is adapted to reduce for instance the acceleration forces, that affect the module for instance in case of a 16 g crash deceleration. Therefore the maximum loads can be reduced by the damper element, so that the forces respectively acceleration/deceleration loads at the connection points between the module and the fuselage or floor are minimized.

According to a further embodiment of the invention, the damper element is located in the rail element or in the frame device.

According to a further embodiment of the invention, the module further comprises an adapting element, whereby the adapting element is located between the module and at least to one of the fuselage structure and the floor element. Thereby, the relative movement between the fuselage structure or the floor elements and the module can be absorbed. During the flight the fuselage is deformed for instance by influence of the in-flight loads, so that the connection points can be designed flexible by using the adapting element. The adapting element can for instance consist of a flexible lever or telescoping halves of a frame device.

According to a further exemplary embodiment of the invention the functional element is movable in respect to the frame device. Therewith, each position of the functional element can be placed individually along the frame device. For instance by using a seat element as first functional element, the height or the longitudinal position can be changed individually. For instance, by using a stowage bin as a functional element also the height of the stowage bin can be configured individually so that for instance smaller persons can access the stowage bin more easily. This can be realized by constructive elements for instance by fixing the attachment element to the frame device eccentrically. Also other constructions such as rails or a snap construction can be provided. Thus, the comfort for each passenger can be raised enormously because everybody can adjust his personal environment.

According to a further exemplary embodiment of the invention, the frame device comprises a plurality of frame elements, wherein the frame elements are mounted detachably. By using a plurality of frame elements to generate a frame device, for instance the measures of the frame element can be designed individually. During the installation of the modules, it is much easier to carry the single frame elements into the aircraft than the whole frame device itself. Therewith the assembly and the installation of the frame device including the functional elements can be eased enormously.

According to a further exemplary embodiment of the invention, the frame elements can be connected adjustable. Therewith an already installed frame device including the plurality of frame elements can be adjusted easily without reassembling the frame. Especially by changing the position of the module along the longitudinal direction of the fuselage of an aircraft, sometimes in the front and/or the rear end a smaller diameter than at the centre section can be encountered. Thus, the frames of the module have to be adjusted in case of sliding the modules along a fuselage. By using this exemplary embodiment of the present invention an adjustment of the module size, respectively the frame device, can be accomplished very fast and very easily.

According to a further exemplary embodiment of the present invention, the plurality of frame elements are designed telescopically for providing for instance flexible measures of the frame device. According to a further exemplary embodiment of the present invention, the frame elements can also be adapted to be foldable.

According to a further exemplary embodiment of the invention, each frame element of the plurality of frame elements has a different shape in comparison to the plurality of frame elements. Thus, a plurality of different shapes of the frame device can be accomplished, so that very flexible installations of the module in a fuselage of an aircraft can be provided.

Favourite shapes in frame elements or frame device configurations can be closed, surrounding frame shapes, such as circles, rectangles or other closed shapes, but also open shaped frames like for instance frames with a C-shape, G-shape, I-shape, L-shape, A-shape, H-shape or T-shape etc.

According to a further exemplary embodiment of the present invention, the module is adapted to be connectable to a primary aircraft structure in such a manner, that the module absorbs loads from the primary aircraft structure. The wording "Primary aircraft structure" defines all fuselage parts that are supporting the structure of a fuselage, such as frames and stringers. Therewith the functions of the fuselage primary structure and the frame device according to the present invention can be combined. By connecting the module to the primary aircraft structure in a load carrying manner, the inventive module of this embodiment can reinforce the primary aircraft structure. Thus, most of the structural frames or stringers can be combined or integrally performed with a module according to the present invention, so that the total weight of the structure and the costs can be reduced.

According to a further exemplary embodiment of the present invention, the frame device is shaped in such a way, that the frame device conforms with the shape of at least one of the fuselage structure and the floor element. Thus, the frame device can be installed very space-saving in the aircraft fuselage and additionally no disturbing elements, such as frame pillars, can be recognized by the passengers.

According to a further exemplary embodiment of the present invention, the functional element is mounted modularly to the frame device. Therewith the functional element can be replaced individually. For instance by using a seat device as first functional element, it can be very useful to exchange business class seats with economy class seats. Also by using restrooms as functional element the airliners can exchange easily and very fast the toilet instead of a row of seats. Thus, the airplane can provide more efficiency, because every airline can adapt cabin layouts according to their own needs.

According to a further exemplary embodiment of the present invention the functional element consists of a transversal stowage bin.

According to a further exemplary embodiment of the present invention, the transversal stowage bin comprising an opening for placing items in the transversal stowage bin, wherein the aircraft has a longitudinal direction in or against flight direction and wherein the opening is accessible in or against flight direction. In common passenger aircrafts, loading or unloading luggage into/out of the stowage bins is very time consuming, because the openings of the stowage bins are accessible from the aisle of the cabin, respectively from an orthogonal direction to the longitudinal direction of the fuselage respectively to the flight direction. In case that one passenger tries to put items into the stowage bins it is impossible for other passengers to bypass this passenger along the aisle. By using the module according to this exemplary embodiment, each passenger can have his individual transversal stowage bin, that is operable from the transversal passage way between two neighbouring seat rows. Additionally by using this inventive transversal stowage bin assembly, it is possible to provide more space between the seat rows, because no overhead elements need to be installed above the transversal passage way between two seat rows. Thus, there is also more available space for each passenger. Further on, by installing separation walls in the transversal stowage bin, an individual stowage bin for each passenger can be provided.

According to a further exemplary embodiment of the invention, the stowage bin comprises at least one functional tool, wherein the at least one functional tool is selected from the group consisting of lighting, air condition, loudspeakers, televisions, computers and oxygen masks. Thus, these functional tools can be fixed to the functional elements such as the stowage bin. Therewith by moving or relocating the module including the stowage bins, all functional tools will also be repositioned. The functional tools can also be fixed integrally or removable with a stowage bin.

According to a further exemplary embodiment of the invention, the functional element consists of a seat element.

According to a further exemplary embodiment of the present invention, the seat element is adapted to be foldable, so that modules that are not in use can be pushed together and placed in a space-saving manner at one end of the cabin. For instance, if more first or business class seats are required, also more space between the modules respectively the seat rows is required, so that the excessive modules have to be stored in the cabin end. By folding the seats or also the stowage bins more modules can be stored easily.

According to a further exemplary embodiment of the present invention, at least one of the first functional element and the second functional element is selected from the group of monuments, galleys, lavatories, PSUs, lighting, air condition, loudspeakers, televisions, computers and oxygen masks.

According to a further exemplary embodiment of the invention, the module further comprises a supply connection for supplying at least one of the first functional element and the second functional element wherein the supply connection is adapted to be engageable with supply elements of the fuselage. Thereby, for instance a rail can be provided on the fuselage side to keep sliding contact in case the module is repositioned. By providing a flexible connection between the functional elements and the supply elements of at least one of the fuselage and the floor element, it is assured that even in case of relocating the modules, each of the functional elements is connectable to required sources, for instance electricity, cooling air or oxygen. Or all supplied functions like i.e. electricity, cooling air or oxygen can be provided by feeder rails, thus modules can relocated without disrupting any supply function.

According to a further exemplary embodiment of the present invention, the frame device comprises a plurality of functional elements, for instance by using seats as a first functional element and stowage bins as second functional element, a frame device according to this exemplary embodiment can provide for instance a row of a random number of seats and a random number of stowage bins. By relocating the module, also all seats and stowage bins will be relocated in the same step. Also the desired amounts of other kinds of functional elements can be attached to one frame device.

According to a further exemplary embodiment of the present invention, the module comprises a plurality of frame devices. Therewith it is possible, for instance, to design a module having an upper frame device including a functional element, for instance, a stowage bin and lighting, and having a second frame device including seats. Thus, it is possible to replace each frame device individually without a connection between the first frame device and the second frame device. Therewith more flexibility can be provided.

Usable materials for frame devices can consist of carbon fibre, aluminium or various composite fibres, glare etc.

According to a further exemplary embodiment of the method, an adapting element adapts to the relative movements between the module and the fuselage.

According to a further exemplary embodiment of the method, a plurality of frame elements of the frame device is connected adjustably for providing flexible measures of the frame device.

According to a further exemplary embodiment of the method, the plurality of frame elements is modularly connected, wherein each frame element of the plurality of frame elements has a different shape in consideration to the plurality of frame elements.

According to a further exemplary embodiment of the method, the module is connected to the primary aircraft structure for absorbing loads in such a manner, that the module is part of the primary aircraft structure.

According to a further exemplary embodiment of the method, the functional element is mounted modularly for being exchangeable.

According to a further exemplary embodiment of the method, the functional element is supplied in such a way, that a supply connection of the module is connected with supply elements of at least one of the fuselage structure and the floor element. By using a feeder rail principle, a sliding contact between the module and the fuselage can be provided.

According to a further exemplary embodiment of the method, the frame device can be operated electrically for moving the module along at least one of the fuselage structure and the floor elements by means of a control unit.

According to a further exemplary embodiment of the invention, the module having the above-mentioned features is used in an aircraft.

According to a further exemplary embodiment of the invention, an aircraft comprising a module having the above mentioned features is provided.

The exemplary embodiments of the module are also valid for the system and the method as well as for the use and the aircraft and inversely.

BRIEF DESCRIPTION OF THE DRAWINGS

In the following, exemplary embodiments of the present invention will be specified for further explanation and for better understanding with reference to the attached drawings.

DETAILED DESCRIPTION OF THE PREFERRED EMBODIMENTS

Figure 1:
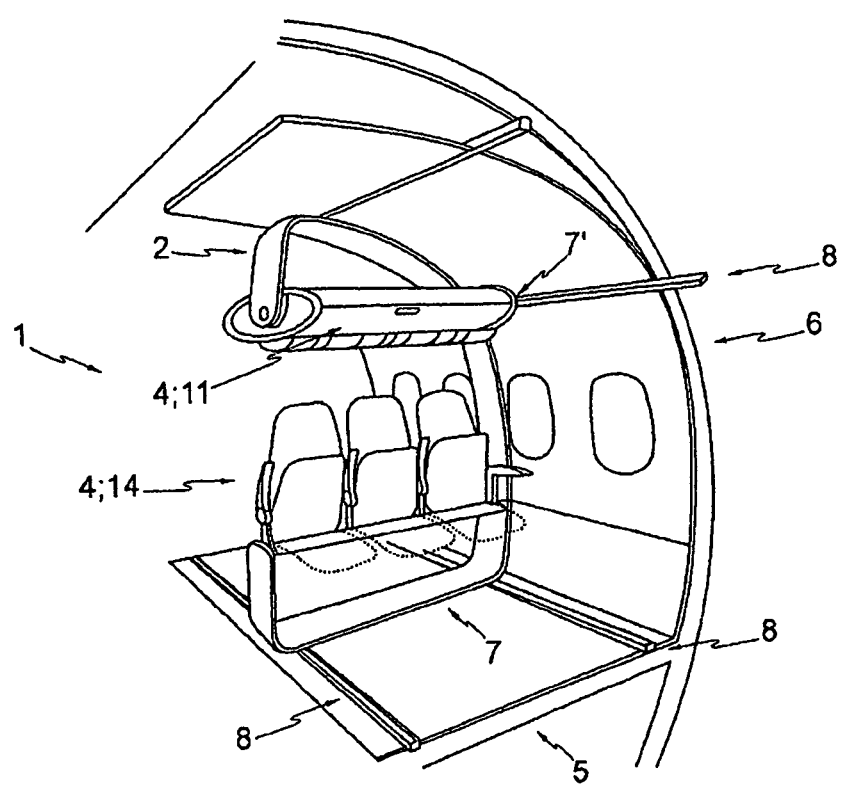
FIG. 1 shows a schematic view of an exemplary embodiment of the module with an open frame shape according to the present invention.

Similar or relating components in the several figures are provided with the same reference numerals. The view in the figures is schematic and not fully scaled.

Figure 2:
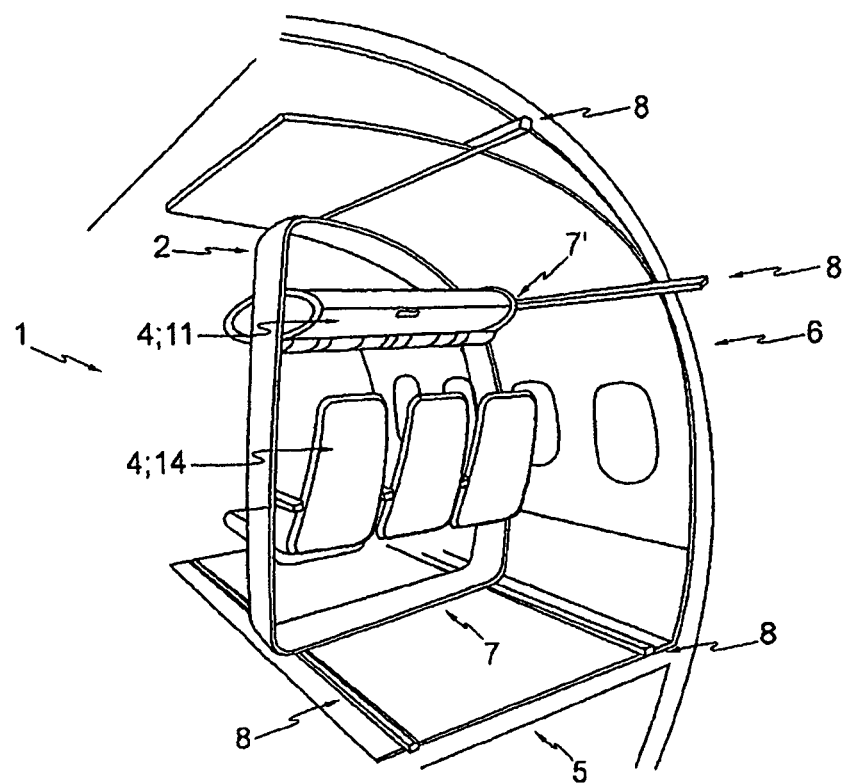
FIG. 2 shows a schematic view of an exemplary embodiment of the module with a closed frame shape according to the present invention.
Figure 3:
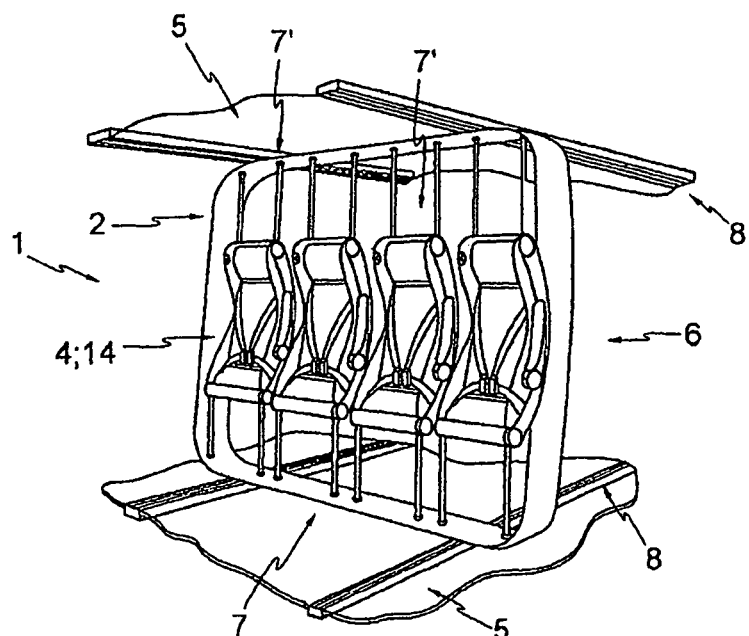
FIG. 3 shows a schematic view of an exemplary embodiment of the module with an closed frame shape and supported standing places for passengers.

FIG. 1 to 3 illustrate schematic views of exemplary embodiments of the present invention. A module for an aircraft is shown, wherein the aircraft having a fuselage structure 6 and a floor element 5. The floor element 5 defining a floor plane. The module comprises a frame device 2 wherein the frame device 2 is adapted for mounting a functional element 4. The frame device 2 is adapted for attachment to the floor element 5 of the aircraft at a first location 7 in the floor plane and wherein the frame device 2 is adapted for attachment to the fuselage structure 6 of the aircraft at a second location 7'. The second location 7' is thereby not in the floor plane.

It is further illustrated a rail element 8 whereby the frame device 2 can be fixed relocatable respectively movable to the rail 8. By using as shown an aircraft seat 14 or an overhead stowage bin 11 as functional element 4, an easy relocation of the whole module 1 can be provided. In common aircraft cabin it is very complicated and time consuming to change the seat layout. When changing single seat positions, all necessary overhead functional elements such as oxygen masks, lighting or air condition need to be adapted separately to the new seat position. As shown in FIG. 1, by replacing the seat elements 14 of the described module, the overhead functional elements 4, 11 will be relocated automatically.

FIG. 1 shows thereby an open frame shape 2, wherein FIGS. 2 and 3 illustrate a closed frame shape 2. By using a closed frame shape, more stability can be provided.

FIG. 3 shows a exemplary embodiment of supported standing places for passengers. The centre of gravity of the passengers body is thereby very high above the floor 5, so that by fixing the support 14 just on the floor section 3 will lead to high torques. By means of the frame device 2 the frame surround the centre of gravity, so that high torques are avoided.

Figure 4:
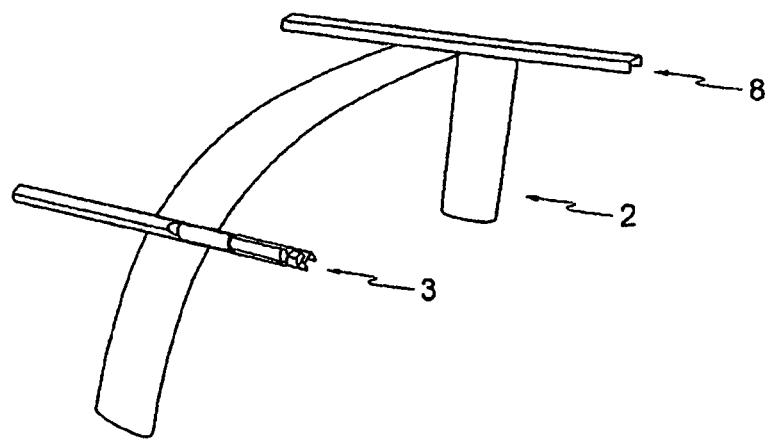
FIG. 4 shows a schematic view of a damper integrated in a rail in order to absorb 16 g loads.

FIG. 4 illustrates a damper element 3 integrated in a rail in order to absorb 16 g loads.

Figure 5:
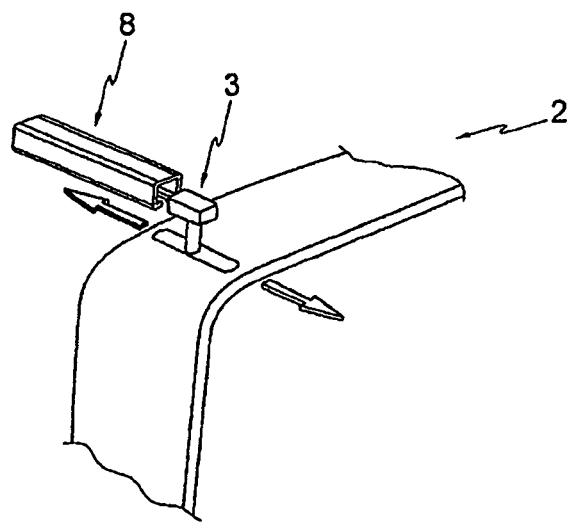
FIG. 5 shows a schematic view of a damper integrated in a frame device in order to absorb 16 g loads.
Figure 6:
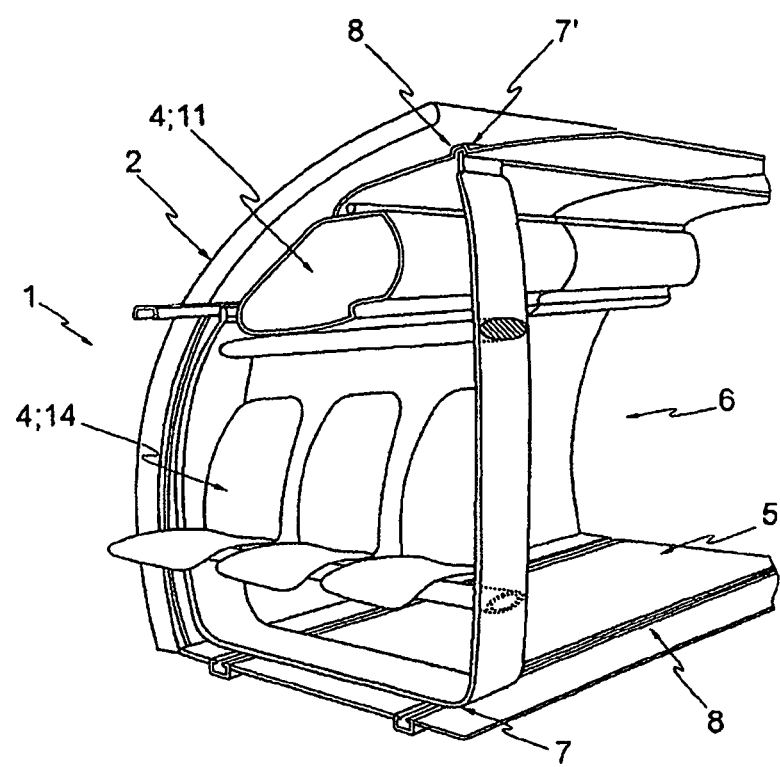
FIG. 6 shows a schematic view of an open frame in a U-shape.

FIG. 5 shows a schematic view of a damper integrated in a frame device in order to absorb 16 g loads;

FIG. 6 shows a schematic total view of a frame device 2 of a module 1, which is movably connected to the rail element 8. As shown a plurality of connection elements 3 that are connected to the rail elements 8 can be provided in order to reinforce the connection between the module 1 and the fuselage 6. FIG. 6 illustrates an open frame 2 with its open portion at the upper end of the surrounded area and hence describing a U-shape that allows the use of the module 1 in combination with a conventional longitudinal bin 11. The typical layout flexibility of the module is provided by all functional elements of a PSU being contained in a horizontal beam that is connected to the U-shaped frame 2.

Figure 7:
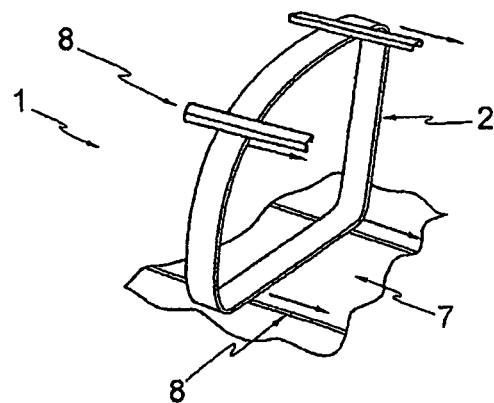
FIG. 7 show a schematic view of rails surrounding the centre of gravity of the module.

FIG. 7 shows an exemplary construction for attaching the module 1 relocatably and moveable to the fuselage structure 6 and the floor element 5. By using rails it is possible to provide an easy constructive method for moving the frame devices 2 respectively the module 1. Connection elements 3 may be fixed to the frame device and are movably engaged with the rail 8. The frame device 2 provides thereby a closed, surrounding shape.

Figure 8:
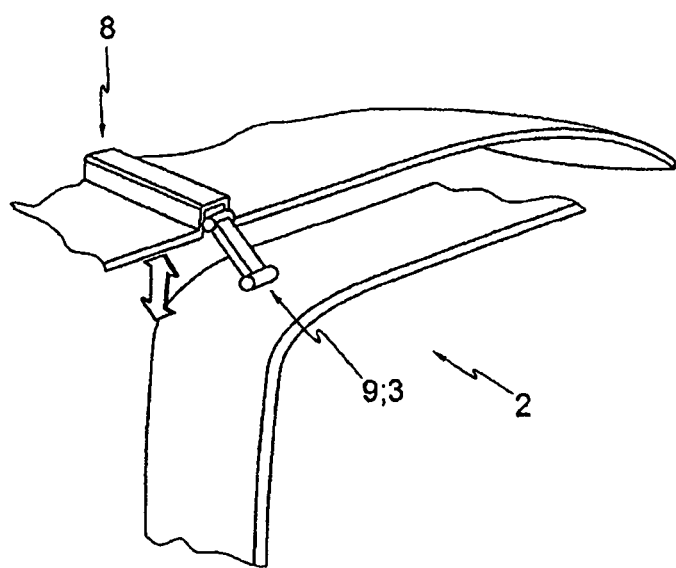
FIG. 8 shows a schematic view of an exemplary adapting system of the module to the relative movement of the fuselage; by means of a lever.
Figure 9:
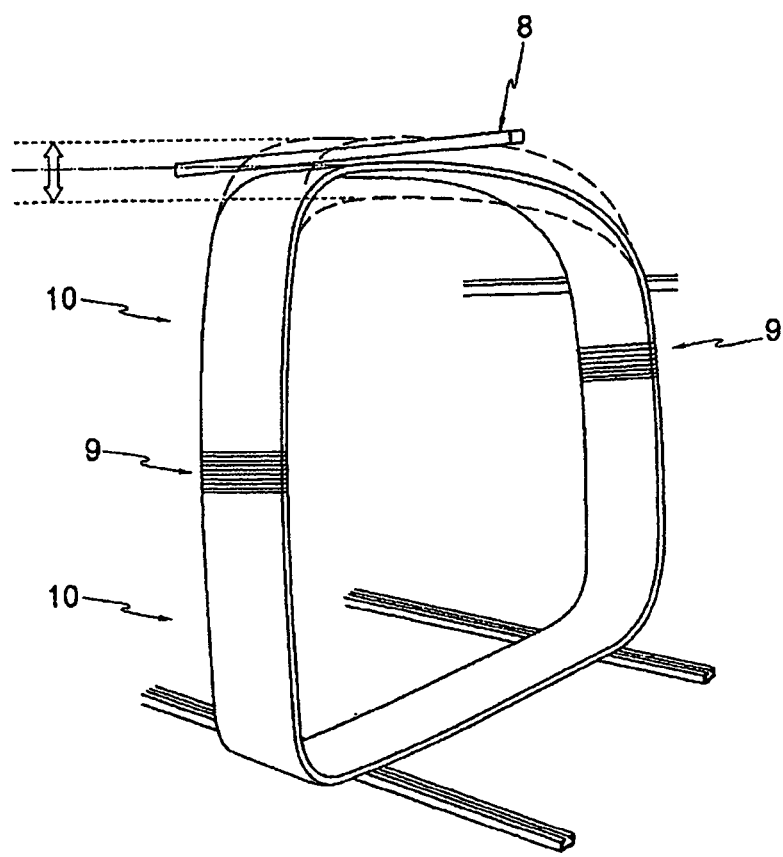
FIG. 9 shows a schematic view of an exemplary adapting system of the module to the relative movement of the fuselage by means of a telescoping element within the frame device.

FIGS. 8 and 9 illustrate a frame device 2 that is connected to a fuselage 6, wherein an additional adapting element 9 is included. In this exemplary embodiment, the adapting element 9 is connected to the frame device for adapting relative movements between the fuselage 6 and the frame device 2.

In FIG. 8 the frame device 2 adapts to the relative movements of the fuselage structure 2 by means of an adapting lever 9.

FIG. 9 shows a schematic view of an exemplary adapting system of the module to the relative movement of the fuselage by means of a telescoping element within the frame device.

Figure 10:
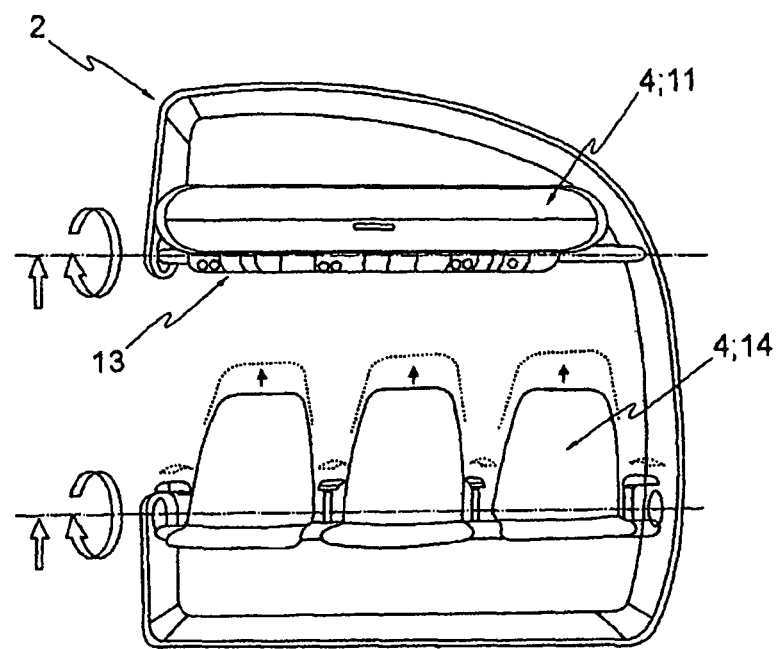
FIGS. 10 and 11 show a schematic view of an exemplary embodiment for adjusting the functional elements.
Figure 11:
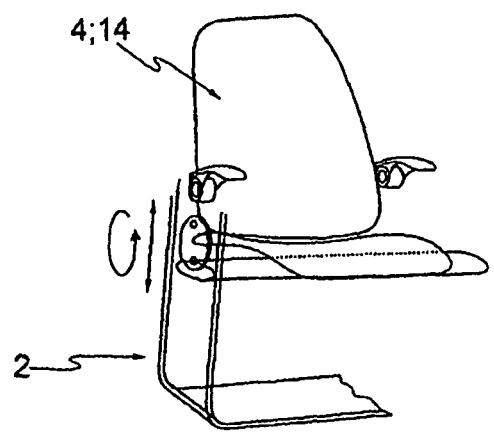

FIGS. 10 and 11 show a further exemplary embodiment of the present invention whereby the functional elements 4, 5 can be relocatably fixed to the frame device 2. The functional element 4 is fixed thereby adjustable to the frame device 2 to enable an adjustment. To realize the adjustability of the functional elements 4 simple constructions can be provided, for instance by connecting the attachment elements or the functional elements eccentrically to the frame device 2. As shown with the arrows in FIGS. 10 and 11, the functional elements, here for instance the seats or the stowage bins, can be adjustable in height.

FIG. 11 shows a more detailed view of an adjustable seat 14 that is adjustably mounted to the frame device 2.

Figure 12:
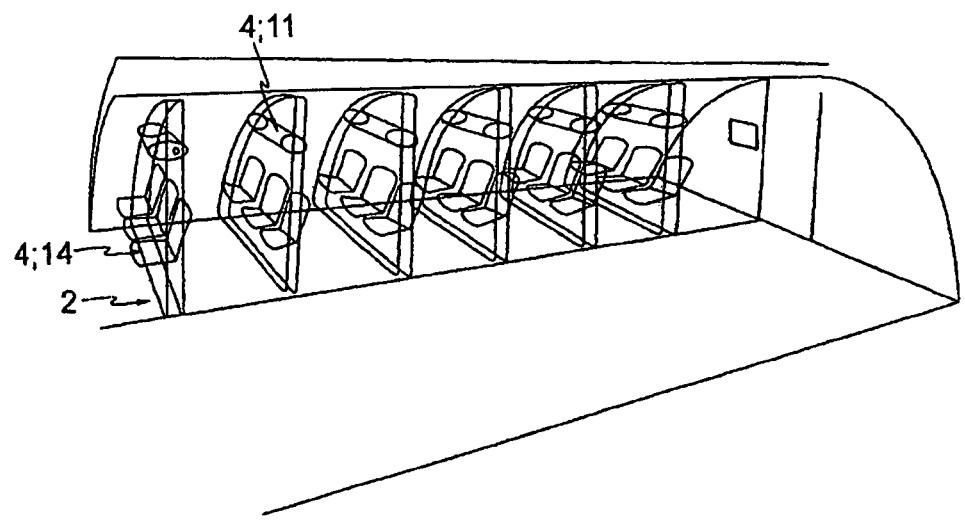
FIGS. 12 and 12' shows the an exemplary arrangement of seats in two different seat pitches and heights.
Figure 12:
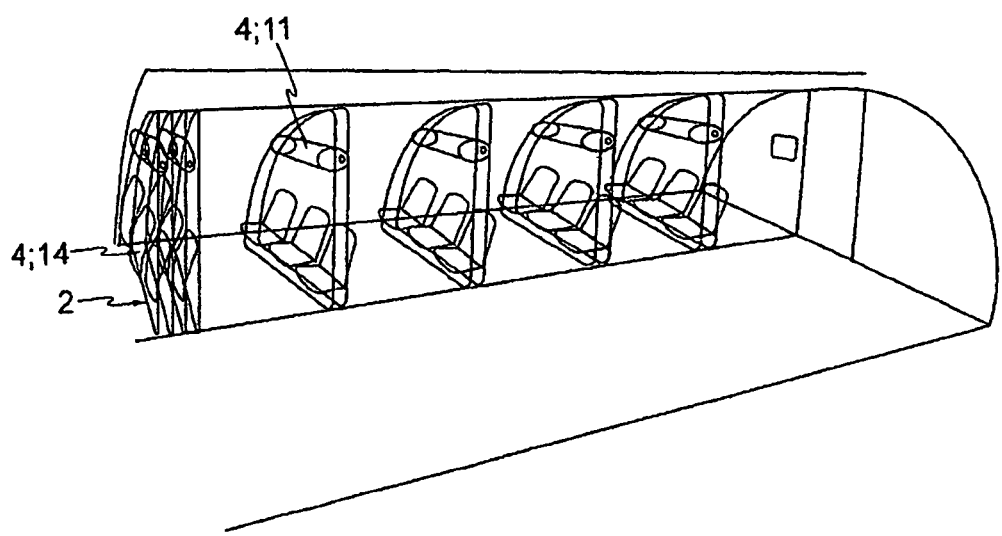

FIG. 12 shows an exemplary view of a seat layout with reduced seat pitch made possible thanks to an increased seat height. The increased seat height allows for an increased luggage volume below the seats.

FIG. 12' shows an exemplary view of a seat layout with increased seat pitch but reduced seat height for more comfort. The modules not in use are stowed away in one end of the cabin.

Figure 13:
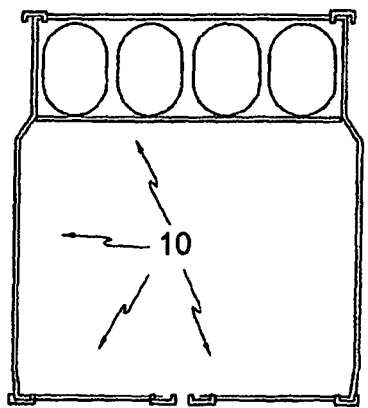
FIGS. 13 to 15 show exemplary embodiments of different frame shapes.
Figure 13:
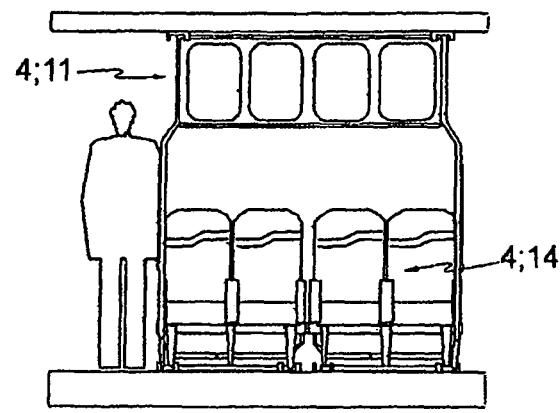
Figure 14:
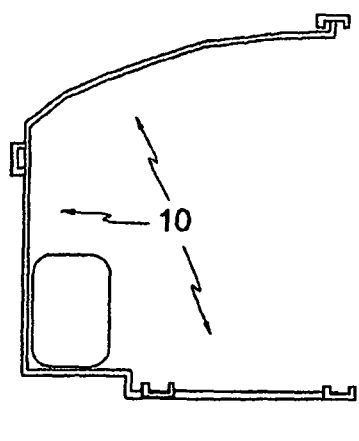
Figure 14:
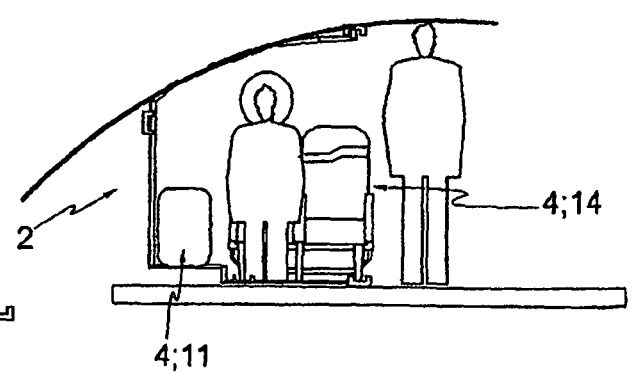
Figure 15:
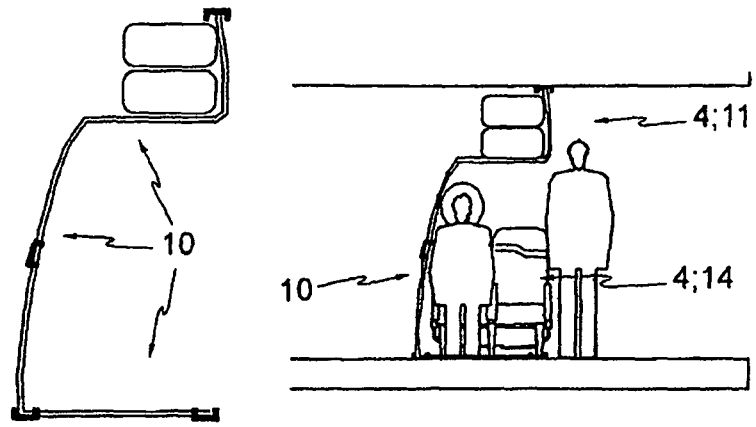

The FIGS. 13 to 15 are showing some exemplary embodiments of different frame shapes. FIG. 13 illustrates a closed, surrounding frame device 2 consisting of several frame elements 10. The frame elements 10 form two closed frames, wherein in the upper rectangle frame a stowage bin 11 can be located and in the lower rectangle a seat row 14 can be installed as shown in FIG. 13'.

FIGS. 14 and 14' show an open frame device consisting of frame elements 10 with an open shape, here in a C-shape. On the bottom elements 10, a step is provided wherein in the lower stage provides a functional element 4, for instance a seat element 14, and in the upper stage a stowage bin 11 for storing items.

FIGS. 15 and 15' show a further shape of the frame device 2 consisting of several frame elements 10 wherein a lower section builds a C-shape but also containing an upper section. In the lower section a functional element 4 can be placed, for instance a seat element 14, whereas in the upper section a stowage bin 11 can be placed as a functional element 4.

Figure 16:
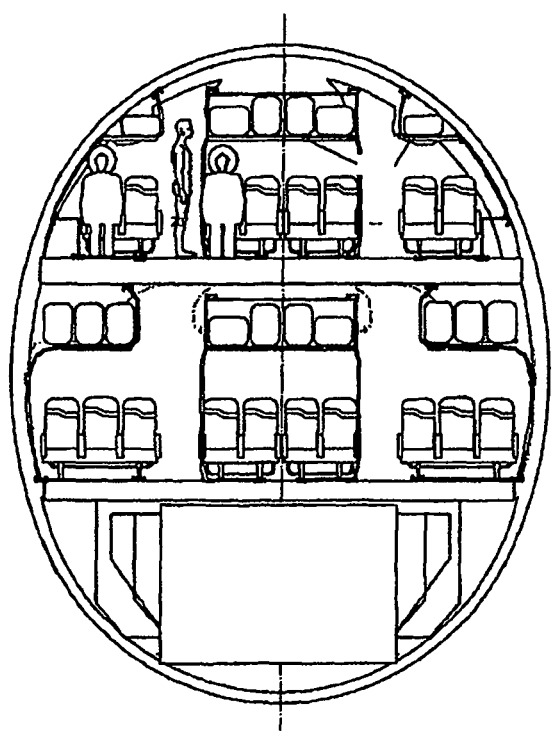
FIGS. 16 and 17 show exemplary front view of cross-sections including exemplary embodiments of different frame shapes.

FIG. 16 and show a front view of a cross-section of a fuselage, wherein FIG. 16 shows a three level fuselage layout.

In the second and third level all differently shaped frame devices 2 are installed for the various purposes. In the middle stage for instance the shape of the frame device shown in FIG. 10 is installed on the right and the left side for providing an optimal cabin layout with optimized space saving installation. In the middle of the second and third level frame devices according to FIG. 8, 8' are installed for providing a space-saving cabin layout.

Figure 17:
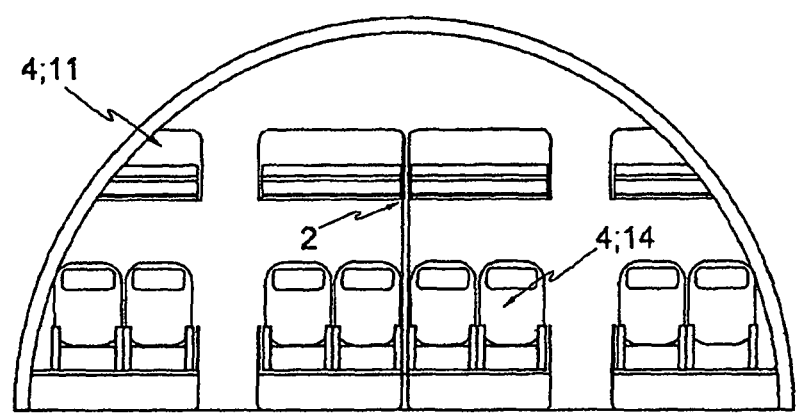

FIG. 17 shows a single deck two aisle fuselage cross-section equipped with open frame modules 1. The open portion of the respective frame is adjacent to the respective aisle.

Figure 18:
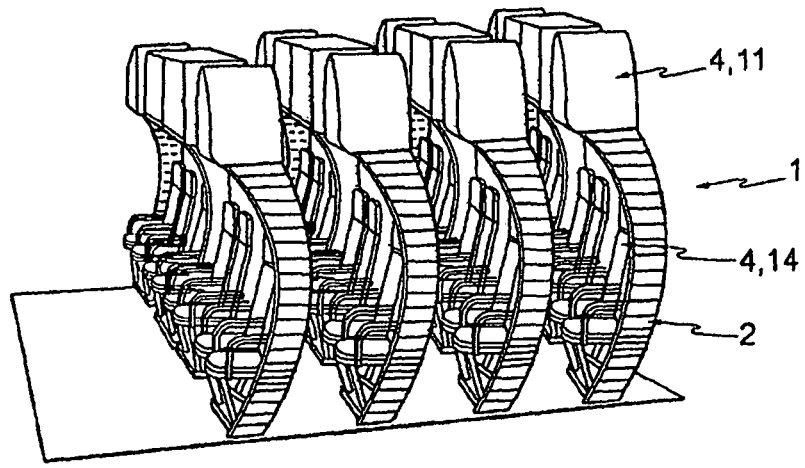
FIGS. 18 and 19 showing a schematic view of a cabin layout according to one exemplary embodiment of the present invention.
Figure 19:
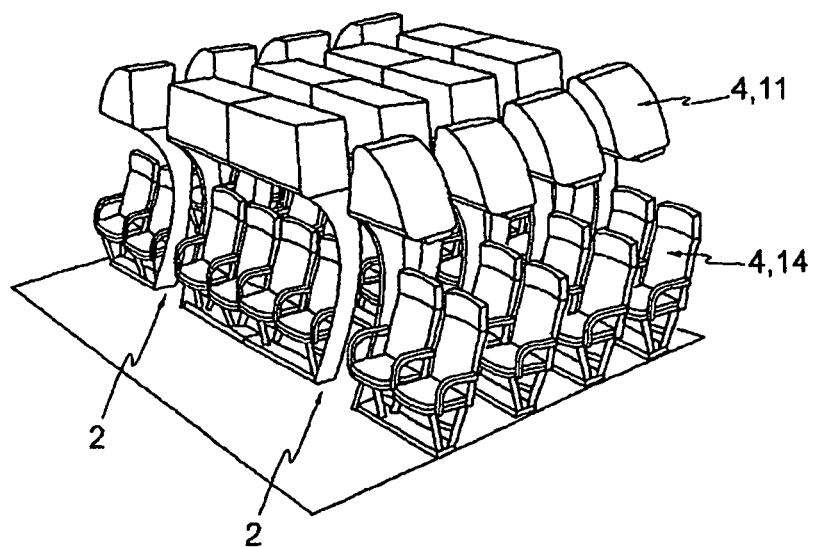

FIGS. 18 and 19 show three-dimensional views of cabin layouts according to an exemplary embodiment of the present invention. As illustrated, the frame devices 2 are curved either in longitudinal direction of the fuselage 6 or in such a way to conform to the shape of the sidewalls of the fuselage 6. By curving the frame devices 2 in a longitudinal direction of the fuselage 6, the field of vision of the passengers will be optimized. By conforming the shape of the frame device 2 with the fuselage structure 6, the available space in the cabin will be optimized and disturbing frame parts can follow the contour of the side panels of the aircraft structure. As shown, the frame shape can either be opened to the aisle side or the window side.

Additionally, as shown in FIGS. 18 and 19, the aisle between the seat rows can be kept free of any overhead elements such as stowage bins or oxygen masks, so that the available height increases the comfort level for the passengers.

Figure 20:
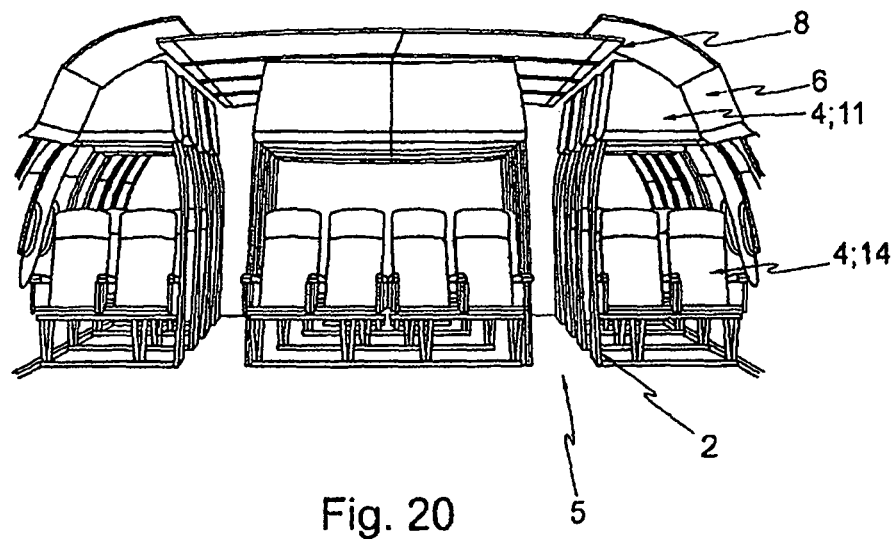
FIG. 20 shows a schematic front view of a cabin layout according to an exemplary embodiment of the present invention.
Figure 20:
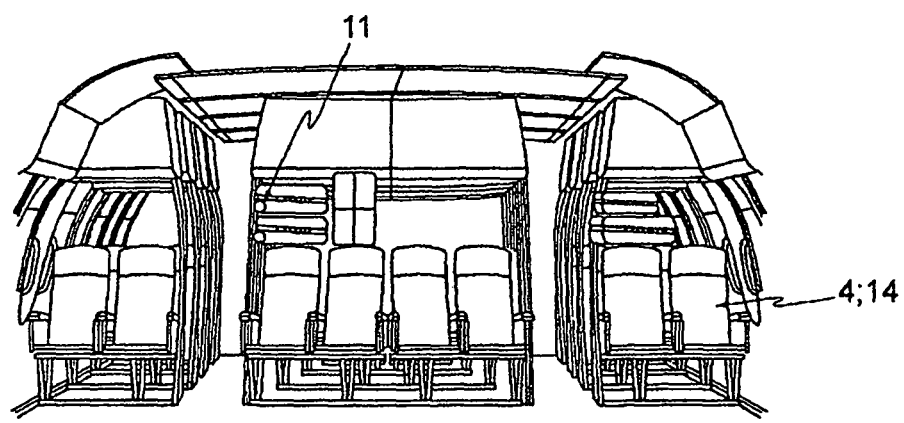

FIGS. 20 and 20' show an exemplary embodiment of the present invention wherein the stowage bins 11 are accessible in longitudinal direction of the fuselage. As seen in FIG. 20', by accessing the stowage bin 11 in longitudinal direction, the aisle between the seats 14 in longitudinal direction can be kept free. As a result the turnaround time can be shortened. By installing a dividing wall, also individual stowage bins 11 for each passenger can be provided. The overhead stowage compartments 11 can be designed as fixed bins with a floor and an upper hinged lid to give access when stowing luggage or as movable bins which move downward around a pivot or by various kinematics like parallelograms or others. Luggage can also be stored under the passenger seats.

Figure 21:
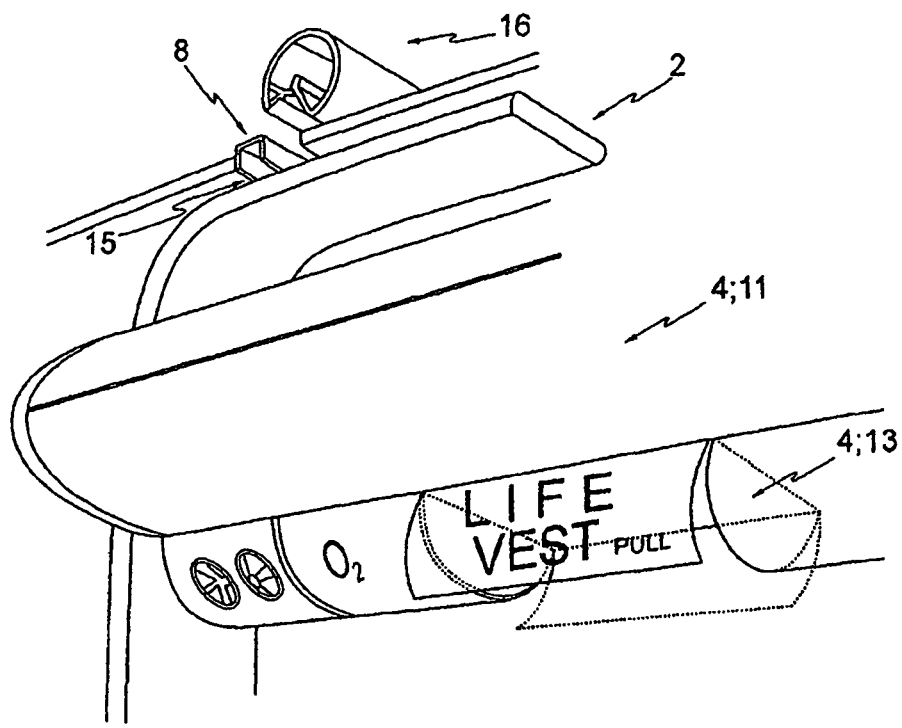
FIG. 21 shows an exemplary view of a supplying system according to one exemplary embodiment of the present invention.

FIG. 21 shows an exemplary embodiment of a supply system for the functional elements 4 or the functional tools 13. As seen in FIG. 21, a supply connection 15 is fixed to the frame device 2, that can be adapted to be engageable with a supply element 16 of the fuselage structure 6. When relocating the frame device 2, the supply connection 15 will remain connected with the supply element 16 of the fuselage. Thus, a supply will remain undisrupted for any position of the module 1 along the entire fuselage 6. By using a feeder-rail principle, the supply connection 16 can be designed like a rail, including for instance air or electricity lines. The supply connection 15 of the module can be in slideable contact with the feeder-rail 16 and respectively in slideable contact with the supply sources.

Figure 22:
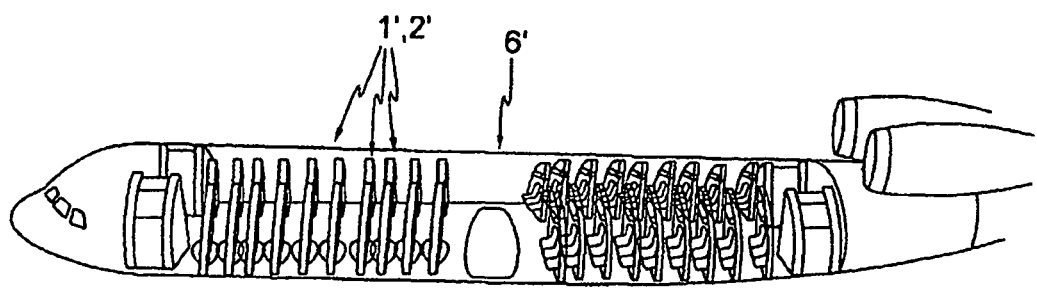
FIG. 22 shows a schematic view of an aircraft fuselage using the modules as a part of the aircraft primary structure according to one embodiment of the present invention.

FIG. 22 shows a fuselage 6' wherein the frame devices 2 of the modules 1' are installed rigidly with the fuselage primary structure 6'. By connecting the modules 1' rigidly to the aircraft primary structure 6' it is possible to absorb loads by the modules. Thus, the fuselage frames can be built integrally with the frame device 2', so that weight and complexity of the fuselage construction can be reduced.

Figure 23:
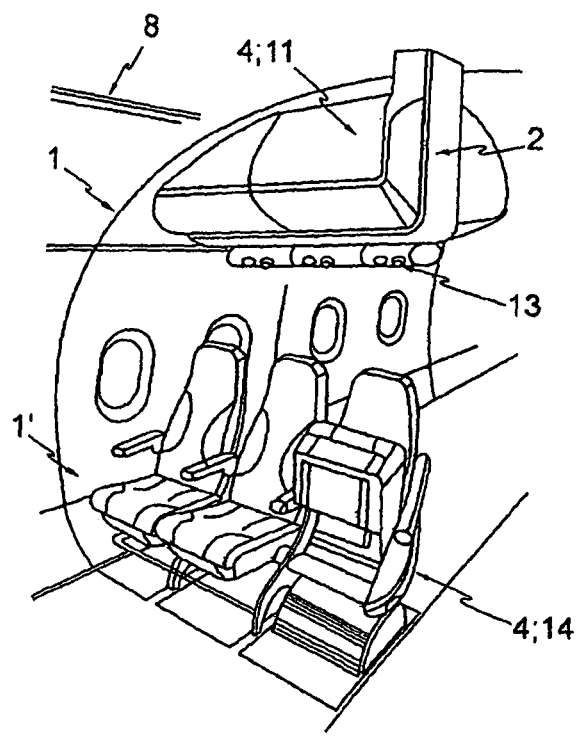
FIGS. 23 and 24 show an exemplary embodiment of the module comprising two independent frame devices.
Figure 24:
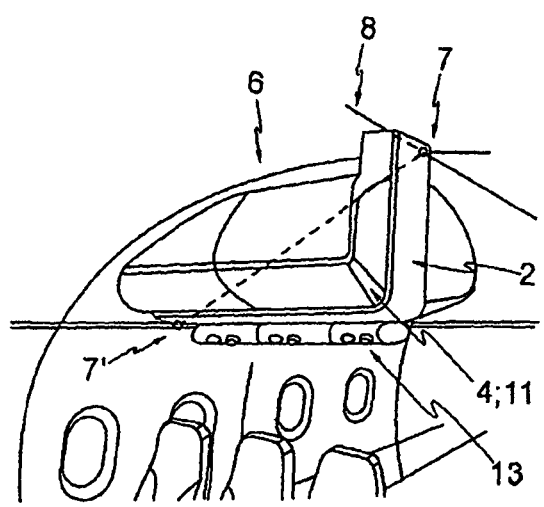

FIGS. 23 and 24 are showing further exemplary embodiments of the module 1 comprising a plurality of frame devices 2. In FIG. 23 an upper frame device 2 is shown, wherein a functional element 4; 11 is installed. An independent second frame device 2' is installed on the lower side of the module 1 wherein a second functional element 4; 14 is installed. Thus, by changing the location of the module 1, the upper and lower frame devices 2, 2' can be relocated independently.

Further on, FIG. 23 illustrates a foldable seat element 14' for reducing the space requirements for a module 1.

FIG. 24 shows an exemplary embodiment of an installation of a stowage bin 11. The frame device 2 is connected to a rail element 8 by connection elements 3. The connection elements 3 are fixed to the fuselage structure 6 by two connecting points 3. The connecting line between the connecting points 3 runs through the centre of gravity of the stowage bin 11 in order to optimize the load distribution of the stowage bin 4, 11 and to minimize the torques.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. An aircraft having a fuselage structure and a floor element defining a floor plane of a passenger aircraft cabin interior space, wherein the aircraft comprises a module, the module comprising:
   a frame device;
   wherein the frame device is mounted in the aircraft cabin interior space;
   wherein a functional element is mounted by the frame device;
   wherein the frame device surrounds a center of gravity of the functional element;
   wherein the frame device is connected to the functional element by at least first and second connection points, wherein a connecting line between the first and second connection points runs through the centre of gravity of the functional element;
   wherein the frame device is attached to the floor element of the aircraft at a first location in the floor plane;
   wherein the frame device is attached to the fuselage structure of the aircraft at a second location;
   wherein the second location is not in the floor plane;
   wherein the frame device has a frame shape adapted to provide a connection between the attachment to the floor element at the first location and the attachment to the fuselage structure at the second location;
   wherein the functional element includes at least one element selected from the group consisting of: a transversal stowage bin, a seat element, a monument, a galley, a lavatory, a Passenger Service Unit, lighting, an air condition, a loudspeaker, a television, a computer and an oxygen mask;
   wherein the frame device is slideably attached to the floor element of the aircraft and the fuselage structure, such that the frame device is relocatable from a first position in the aircraft by a sliding movement to a second position in the aircraft; and
   wherein the first position is at a distance in the longitudinal direction of the aircraft from the second position.

2. The module according to claim 1, wherein the floor element of the aircraft and the fuselage structure comprise a rail element; and
   wherein the frame device is slideably mounted by the rail element.

3. The module according to claim 1, further comprising: a damper element;
   wherein the damper element is attached between the frame device and at least one of the fuselage structure and the floor elements.

4. The module according to claim 2, wherein the rail element comprises a damper element for reducing loads.

5. The module according to claim 1, wherein the module further comprises an adapting element,
   wherein the adapting element is located between the frame device and at least one of the fuselage structure and the floor element for adapting relative movements between the frame device and the fuselage structure.

6. The module according to claim 1, wherein the functional element is movable in respect to the frame device.

7. The module according to claim 1, wherein the frame device comprises a plurality of frame elements; and
   wherein the frame elements are detachably mounted.

8. The module according to claim 7, wherein the plurality frame elements are adjustably connected.

9. The module according to claim 7, wherein the plurality of frame elements are telescopically adaptable.

10. The module according to claim 4, wherein the damper element is attached between the frame elements.

11. The module according to claim 1, wherein the module is connected to a primary aircraft structure such that the module absorbs loads from the primary aircraft structure.

12. The module according to claim 1, wherein the frame device is shaped for conforming with a shape at least to one of the fuselage structure and the floor element.

13. The module according to claim 1, wherein the functional element is modularly mounted by the frame device.

14. The module according to claim 1, wherein the transversal stowage bin comprises an opening for placing items in the transversal stowage bin;
   wherein the opening is accessible in or against a flight direction.

15. The module according to claim 1, the transversal stowage bin comprises:
   at least one functional tool,
   wherein the at least one functional tool is selected from a group consisting of lighting, air conditions, loudspeakers, televisions, computers and oxygen masks.

16. The module according to claim 1, wherein the seat element is foldable.

17. The module according to claim 1, the module further comprising:
   a supply connection for supplying the functional element;
   wherein the supply connection is engageable with supply elements of at least one of the fuselage structure and the floor element, and
   wherein the supply connection is in slidable contact with the supply elements, for supplying the functional element.

18. The module according to claim 1, wherein the module comprises a plurality of functional elements.

19. The module according to claim 1, wherein the module further comprises a plurality of frame devices.

20. A system for an aircraft, the aircraft having a fuselage structure and a floor element defining a floor plane of a passenger aircraft cabin interior space, the system comprising:
   a plurality of modules, each module comprising:
   a frame device;
   wherein a functional element is mounted by the frame device;
   wherein the frame device surrounds a center of gravity of the functional element;
   wherein the frame device is connected to the functional element by at least first and second connection points, wherein a connecting line between the first and second connection points runs through the centre of gravity of the functional element;

wherein the frame device is attached to the floor element of the aircraft at a first location in the floor plane;

wherein the frame device is attached to the fuselage structure of the aircraft at a second location;

wherein the second location is not in the floor plane;

wherein the frame device has a frame shape adapted to provide a connection between the attachment to the floor element at the first location and the attachment to the fuselage structure at the second location;

wherein the functional element includes at least one element selected from the group consisting of: a transversal stowage bin, a seat element, a monument, a galley, a lavatory, a Passenger Service Unit, lighting, an air condition, a loudspeaker, a television, a computer and an oxygen mask;

wherein the frame device is slideably attached to the floor element of the aircraft and the fuselage structure, such that the frame device is relocatable from a first position in the aircraft by a sliding movement to a second position in the aircraft, and wherein the first position is at a distance in the longitudinal direction of the aircraft from the second position; and a control unit;

wherein the plurality of modules are configured to be operated electrically for moving from the first position to the second position;

wherein the control unit controls the plurality of modules.

21. A method for an aircraft having a fuselage structure and a floor element defining a floor plane of a passenger aircraft cabin interior space, the method comprising:

mounting a functional element to a frame device;

attaching the frame device to the floor element of the aircraft at a first location in the floor plane; and attaching the frame device to the fuselage structure of the aircraft at a second location;

wherein the frame device surrounds a center of gravity of the functional element;

wherein the frame device is connected to the functional element by at least first and second connection points, wherein a connecting line between the first and second connection points runs through the centre of gravity of the functional element;

wherein the second location is not in the floor plane;

wherein the frame device has a frame shape adapted to provide a connection between the attachment to the floor element at the first location and the attachment to the fuselage structure at the second location;

wherein the functional element includes at least one element selected from the group consisting of: a transversal stowage bin, a seat element, a monument, a galley, a lavatory, a Passenger Service Unit, lighting, an air condition, a loudspeaker, a television, a computer and an oxygen mask;

wherein the frame device is slideably attached to the floor element of the aircraft and the fuselage structure, such that the frame device is relocatable from a first position in the aircraft by a sliding movement to a second position in the aircraft, and wherein the first position is at a distance in the longitudinal direction of the aircraft from the second position.

22. The method according to claim 21, further comprising:

adapting relative movements of an adapting element between the module and at least to one of the fuselage structure and the floor element.

23. The method according to claim 21, further comprising:

adjustably connecting a plurality of frame elements of the frame device.

* * * * *

UNITED STATES PATENT AND TRADEMARK OFFICE
CERTIFICATE OF CORRECTION

PATENT NO. : 9,010,686 B2
APPLICATION NO. : 12/087328
DATED : April 21, 2015
INVENTOR(S) : Saint-Jalmes et al.

Page 1 of 1

It is certified that error appears in the above-identified patent and that said Letters Patent is hereby corrected as shown below:

On Title Page, item (73) Insert Additional Assignee --Airbus Operations GmbH--

Signed and Sealed this
Twelfth Day of April, 2016

Michelle K. Lee
*Director of the United States Patent and Trademark Office*